No. 639,607. Patented Dec. 19, 1899.
J. A. OVERALL.
NUT LOCK.
(Application filed July 17, 1899.)
(No Model.)

WITNESSES:
Franck L. Ourand,
Esther V. Byng.

INVENTOR.
John A. Overall,
BY
Louis Bagger & Co.
ATTORNEYS.

THE NORRIS PETERS CO., PHOTO-LITHO., WASHINGTON, D. C.

UNITED STATES PATENT OFFICE.

JOHN A. OVERALL, OF DE LASSUS, MISSOURI, ASSIGNOR OF ONE-HALF TO AUGUSTUS W. KINZER, OF SAME PLACE.

NUT-LOCK.

SPECIFICATION forming part of Letters Patent No. 639,607, dated December 19, 1899.

Application filed July 17, 1899. Serial No. 724,077. (No model.)

*To all whom it may concern:*

Be it known that I, JOHN A. OVERALL, a citizen of the United States, residing at De Lassus, in the county of St. Francois and State of Missouri, have invented new and useful Improvements in Nut-Locks, of which the following is a specification.

My invention relates to nut-locks principally designed for connecting the ends of railroad-rails, which rails, owing to the vibrations caused by passing trains and to contraction and expansion due to changes in temperature, frequently cause the nuts to work loose. The invention, however, is adapted for use generally wherever it is desired to lock a nut to a bolt, so as to prevent backward movement of the nut.

The object of the invention is to provide an improved construction of nut-lock which shall possess superior advantages with respect to efficiency in use.

The invention consists in the novel construction and combination of parts hereinafter fully described and claimed.

Figure 1:
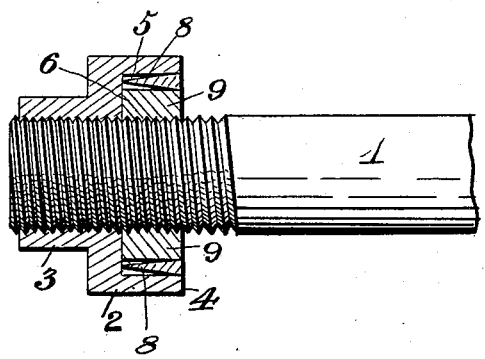
Figure 2:
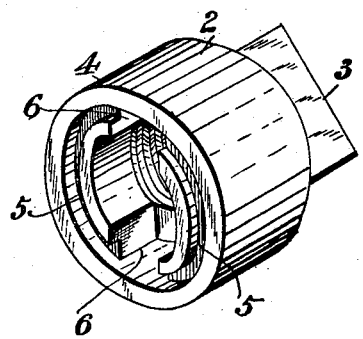
Figure 3:
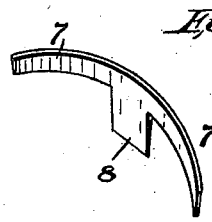
Figure 4:

In the accompanying drawings, Figure 1 is a longitudinal section showing a bolt provided with my improved nut-lock. Fig. 2 is a perspective view showing the nut with the locking devices removed. Fig. 3 is a perspective view of one of the segmental arms and wedges. Fig. 4 is a similar view of the plug provided with the sharpened ribs or teeth.

In the said drawings the reference-numeral 1 designates a bolt of any ordinary or suitable construction, screw-threaded, as usual.

The numeral 2 designates the nut, comprising the angular portion 3 and round head or inner end 4. This nut is formed with interior screw-threads, as usual. Formed in the inner face of said nut is a circular groove 5, provided with two opposite intersecting recesses or sockets 6.

The numeral 7 designates one of two segmental arms adapted to seat in said groove at opposite sides thereof, each of which is provided with a lug 8, the inner face of which is beveled, so as to form a wedge. The two wedges thus formed engage with the recesses or sockets when the arms are forced in the groove.

The numeral 9 designates two metal plates or plugs, the inner sides of which are formed with sharpened ribs or teeth which are adapted to engage with the threads of the bolt.

In practice the segmental arms are seated in the groove in the nut with the wedge of each located in the said recesses, and the plugs are also seated in said recesses, but project slightly beyond the face of the nut. The nut is then screwed on the bolt until it has about reached the limit of its movement, when the plugs will be forced between the said wedges and bolt. The wedges now acting on the outer sides of the plugs or plates will force them inward, causing the ribs or teeth to bite into the threads of the bolt, whereby the nut will be held securely in place and backward movement or loosening of the same be prevented.

Having thus fully described my invention, what I claim is—

In a nut-lock, the combination with the nut formed with a groove in its inner face with opposite intersecting recesses or sockets, of the segmental arms provided with wedges seated in said recesses or sockets, and the plugs or plates formed with ribs or teeth also seated in said recesses and bearing against said wedges, substantially as described.

In testimony whereof I have hereunto set my hand in presence of two subscribing witnesses.

JOHN A. OVERALL.

Witnesses:
 THEO. D. FISHER,
 C. C. BRAFFET.